Aug. 20, 1968     E. T. BROWNING     3,397,469
SCRAPING BLADE ATTACHMENT FOR A RAKE
Filed Feb. 15, 1966
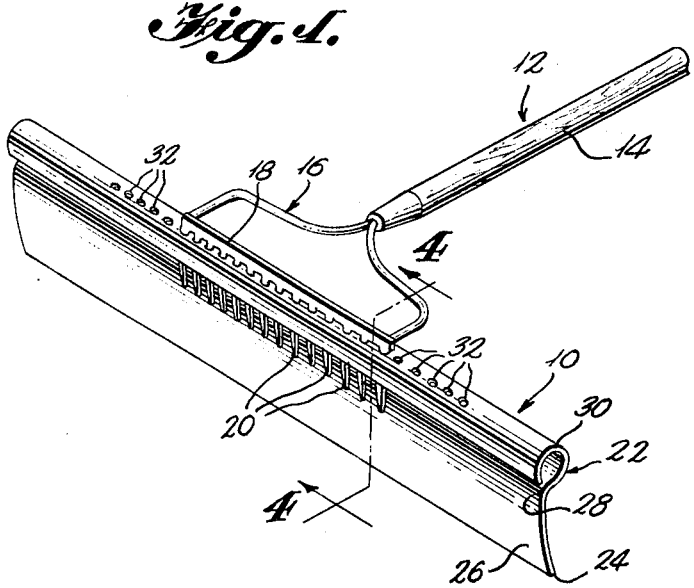
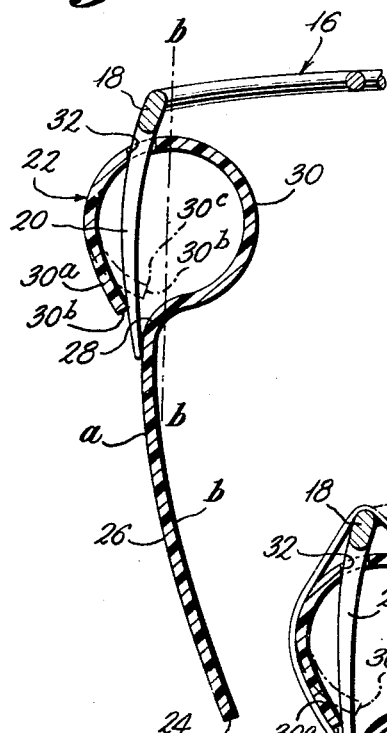
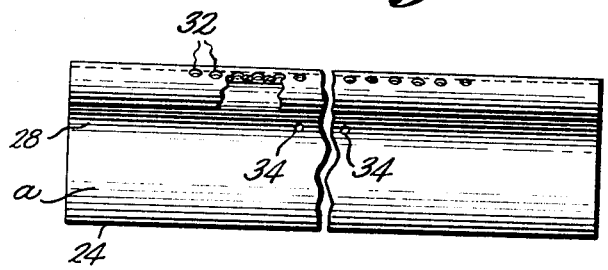
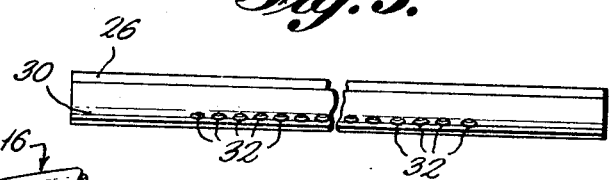
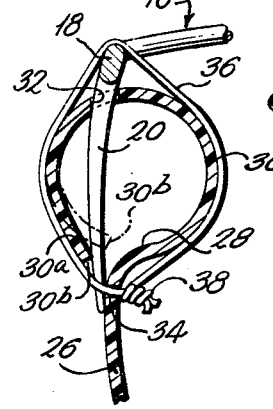
INVENTOR
Espey T. Browning
BY Shoemaker and Mattare
ATTORNEYS United States Patent Office 3,397,469
Patented Aug. 20, 1968

3,397,469
SCRAPING BLADE ATTACHMENT FOR A RAKE
Espey T. Browning, 5700 Nicholson St.,
Riverdale, Md. 20840
Filed Feb. 15, 1966, Ser. No. 527,552
8 Claims. (Cl. 37—53)

ABSTRACT OF THE DISCLOSURE

A scraper blade attachment for a conventional hand garden rake, said rake having a handle with a bar mounted at one end and with a row of tines carried by the bar and projecting outwardly thereof, and said blade being of greater width than the length of the tines and with a portion of said blade being of such dimension as to project considerably beyond the outer free ends of the row of tines, and a unique manner of removably and replaceably attaching the blade to the tines.

---

This invention relates generally to improvements in hand manipulated implements and is directed particularly to an improved implement for scraping up or moving loose material on the surface of the ground and more particularly is directed to hand operated or hand manipulated implements particularly designed for, but not necessarily restricted to, the operation of moving snow for the purpose of clearing pavements, driveways and other surfaces.

The present invention has for a particular object to provide a novel garden rake attachment for scraping snow from a surface such as a pavement, walkway, driveway or the like and it is an especial object to provide a device of this character which when combined, in the manner hereinafter set forth, with a garden rake, will provide a lightweight implement which, because of the light weight thereof, will not materially add to the effort required to use it in the performance of the operation for which it is designed.

Another object of the invention is to provide a snow blade attachment for a garden rake which is uncomplicated in its construction and which when removed from the rake can be easily stored and, particularly, because of its form or design, can be readily stored and shipped in quantities.

Another object is to provide a snow blade attachment for a garden rake which is of a design which would make it relatively inexpensive to manufacture and which can be readily formed or fabricated in aluminum or other metals or alloys, plastics and the like.

Still another object of the invention is to provide a garden rake attachment of the character referred to, which is constructed in a novel manner whereby it can be readily attached to and removed from an ordinary or conventional steel garden rake without need of tools or other devices for effecting such attachment.

More particularly it is an object of the invention to provide a blade device for attachment to a conventional steel garden rake, which device is constructed in a manner to effect firm frictional engagement of the points of the tines of the rake with the blade in an effective manner to securely hold the blade in position on the rake.

A still further object of the invention is to provide a snow blade attachment for a conventional steel garden rake, which is designed to be readily formed from a single piece or sheet of suitably resilient metal or other suitable material and which is designed with means for receiving the tines of the steel rake in such a manner as to effect a frictional locking coupling between the blade and the tines, and which blade is further designed to facilitate the use of auxiliary means for effecting an additional holding connection.

The invention will be best understood from a consideration of the following detailed description taken in connection with the accompanying drawing, wherein FIG. 1 is a perspective view of the snow blade and rake coupled together for use.

FIG. 2 is a rear or back elevational view of the blade, with a portion thereof broken away, showing the apertures for receiving the tines of a steel rake and showing additional apertures for the use of a securing length of material such as a wire or the like.

FIG. 3 is a top view of the blade with the middle portion of the blade broken away.

FIG. 4 is a transverse section taken substantially on the line 4—4 of FIG. 1 and showing the longitudinal edge of the top or head portion of the blade bent or flexed by engagement with the rake tines whereby the rake tines are firmly held in frictional engagement with the body of the blade, the initial unflexed condition of the edge portion of the head being shown in broken lines.

FIG. 5 is a transverse sectional view corresponding to FIG. 4 and showing the addition to the blade of one of a pair of wires which may be applied for more firmly holding the rake and the blade in coupled together condition.

Referring now more particularly to the drawing the numeral 10 generally designates the snow blade attachment for a steel rake while the numeral 12 generally designates a conventional type of steel rake to which the snow blade attachment of the present invention is designed to be attached.

The rake 12 in the type illustrated embodies the usual handle 14 to the forward end of which is secured the relatively wide frame 16 which embodies the transverse bar 18.

The bar 18 is formed or cast integrally with the usual pointed tines 20.

The snow blade attachment 10 embodying the present invention, as hereinbefore stated, may be formed of any suitable metal or other suitable material. For example, the blade attachment may be formed of a sheet of spring steel or the like and while the length and width of the blade may be of any desired dimensions, a suitable and preferred dimension for the length and width would be about 36 inches in length and about 6 to 10 inches in width.

As shown the blade has a top part or top portion, which is generally designated 22, and a straight longitudinal bottom edge 24. This edge may be slightly beveled or sharpened, if desired.

For facilitating the describing of the form of the blade as a whole the side of the blade designated $a$ will be defined as the rear side while the opposite side designated $b$ will be defined as the forward or front side.

The major lower portion of the blade which comprises the body of the blade is generally designated 26. This portion or body of the blade is slightly transversely arcuate as shown, the front or forward side $b$ being the concave side.

The upper portion of the body 26 merges into the forwardly curving high breast portion 28 which defines a relatively short radius arc and this merges into the lower forward part of the transversely rounded head 30 which constitutes the top portion of the blade structure.

The head may be approximately circular in cross section and as it is a forward continuation of the upper part of the body 26, through the breast portion 28, it lies substantially entirely forwardly of the body portion 26 of the structure.

The wall of the head continues upwardly from the breast portion 28, in a steady curve which swings rearwardly at the topmost part of the head and then continues downwardly into the lower forward quarter portion 30a which terminates in the downwardly and forwardly directed edge 30b.

As is clearly shown in FIG. 4, and also in FIG. 5, the edge 30b of the portion 30a of the head 30 is cut square whereby there are produced forward and rearward relatively sharp corners, the forward corner being designated 30c.

The free edge 30b of the head is normally directed downwardly and forwardly toward the upper part of the breast portion 28.

The head 30 has formed therethrough in the top thereof rearwardly of a central vertical longitudinal plane, such plane being indicated by the broken line p—p, the longitudinally extending group or series of apertures 32. The ends of the longitudinal row of apertures 32 are equidistantly spaced from the adjacent ends of the blade as is clearly seen in FIG. 1, which arrangement is preferable so as to give a balanced weight to the device when the blade is attached to a steel rake such as that shown. Obviously, also, the number of apertures and the spacing of the same would be approximately the same as the number and spacing of the rake teeth 20 of the conventional steel rake in which the number of teeth in the various makes is the same. In other words, the number and spacing of teeth in the various makes of steel rakes are standard so that the spacing of the apertures would adapt the snow blade for use with a standard steel rake. In the illustration, additional apertures are shown, which would adapt the blade to use with a rake in which more than the usual number of tines might be present.

As is clearly shown in FIGS. 4 and 5, the free longitudinal edge of the rolled or rounded head 30 normally lies slightly rearwardly of the central longitudinal plane p—p and is spaced above the upper portion of the breast 28. This normal position of the edge 30b is indicated or shown in dot and dash lines.

In the use of the snow blade the points of the rake tines 20 when in the operative position illustrated will have the points thereof pressing against the upper part or upper portion of the rear side of the blade body 26 at the lower part of the breast 28.

In the operation of attaching the blade to the rake, after the tines have been inserted into the apertures 32, the points will be forced down against the curved inner surface of the head just above the bottom edge 30b and by forcing the tines down against this part of the head the edge portion will be sprung rearwardly so that the tines will pass the edge across the corner 30c and move down below the breast portion 28, along the rearward surface thereof. When the tines have been pushed down as far as will be permitted by the bar portion 18 of the rake body, the tips or points of the tines will be pressed firmly against the rearward surface of the blade body and the rearwardly sprung tensioned portion 30a of the head will press inwardly and maintain the points of the tines firmly against the blade body as shown.

From the foregoing it will be seen that after the blade has been placed in operative position upon the rake tines will be pressed more firmly against the rearward side of the blade body as the device is used by pulling the bottom edge of the blade body over the surface against snow or like material. Upon lifting the blade body for the purpose of taking another stroke for moving the snow, the tensioned edge portion 30a of the head will hold the tines firmly in position and thus prevent the blade from dropping off. This action will be more firmly effected by the engagement of the corner 30c with the tines, the sharp corner tending to bite into the metal of the tines and thus resist any tendency of the latter to slip or move upwardly.

While the illustrated contsruction of the blade is such as to maintain a tight connection between the same and the tines of the rake, the blade may be more or less permanently secured to the rake, if desired, so that it could not be knocked loose or made to fall off by being struck accidentally against a fixed object, upon the top of the head. Obviously, in the use of a device of this kind, particularly around gates or porch railings or other such places, there is always the possibility, in raising the blade from the snow to reposition it for making another cleaning stroke, of hitting the top of the blade against a railing or some other adjacent object, with sufficient force to break the attachment between the blade and the tines. In order to avoid the possibility of this happening, the blade body is provided with two or more apertures 34 preferably positioned, as illustrated in FIG. 2, adjacent to the transverse center of the blade, one aperture at each side of the center, as shown.

Use is made of these apertures by passing a wire 36 or other length of suitable material, through each aperture and carrying the wire up and over the top bar 18 of the rake and down to the end of the wire at the opposite side of the blade, the ends of the wire may be twisted together at the forward side of the blade as indicated at 38 below the head and at the forward part of the breast 28 as illustrated in FIG. 5. Thus there is provided a very quick and easy way of fixing the blade to the rake if this should be desired and likewise the blade can be very quickly taken off from the rake when it is no longer needed.

While only two apertures 34 have been illustrated and described for receiving wires or the like to secure the blade to the rake head, obviously additional apertures may be formed in the blade for the use of additional securing wires or the like, if this should be found desirable.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A snow blade attachment for a garden rake having a head part embodying a bar carrying a row of tines having a certain length, said blade comprising a body of sheet material having a length at least as great as the length of the row of tines of a rake to which the blade is to be attached, the blade having a body part of substantial vertical width and having a forward side and a rear side, a tubular head extending longitudinally of the top of the blade body part, said head having a top and having a longitudinal row of apertures therein adapted to have the row of tines of a rake extended downwardly therethrough into and through the head, and tension means forming a yieldable, longitudinally extending portion of said head positioned adjacent to the rear side of the blade body for engaging the rake tines and clamping the ends thereof against the blade body.

2. The invention according to claim 1, in combination with a binding means engaged through an aperture in said blade body and engageable with the head part of a rake and cooperating with said tension means for securing the tines against accidental withdrawal from the head.

3. The invention according to claim 1, wherein the blade body includes means for facilitating securing the same against accidental disengagement of the tines from said tension means by a flexible element engaging said means for binding the blade body to the rake head part.

4. The invention according to claim 3, wherein the last said means consists of an aperture formed through the blade body part below the said head thereof.

5. The invention according to claim 1, wherein said tubular head is rounded in cross section and comprises a forward, upward, rearward and downward continuation of the top of the blade body, the downward continuation portion having a terminal edge between which and the blade body the tines may be positioned.

6. The invention according to claim 1, wherein the said body part of the blade merges at its top into a rearwardly projecting, forwardly and upwardly curving breast portion which continues in a forward, upward, rearward and downward curvature to form the said tubular head, and the said downward curving portion forms the said tension means between the edge of which and the adjacent side of the breast portion of the blade body, the tines may be positioned and secured.

7. The invention according to claim 6, wherein the said edge includes a corner adapted to effect a non-slipping engagement with the tines.

8. The invention according to claim 1, wherein the said blade consists of a single piece of said sheet material, said material being of a relatively stiff, resilient character, the blade being fashioned to have a lower part forming the said body part, and said body part merges at the top thereof into a rearwardly projecting rounded breast portion of relatively short radius, and said tubular head is of generally circular cross section and has a forward and upward curving part and a rearward, downward and forward curving resilient terminal portion having a free edge opposing said breast, and said head has the said row of apertures in the said top thereof positioned rearwardly of the highest part of the top and substantially in the vertical plane of the rear side of said breast.

References Cited

UNITED STATES PATENTS 2,114,518  4/1938  Bayliss _____ 56—400.07
2,637,261  5/1953  Wale _____ 37—53

ROBERT E. PULFREY, *Primary Examiner.*

E. H. EICKHOLT, *Assistant Examiner.*